designation
2,842,452

CELLULOSE NITRATE-LIQUID POLYMER OIL COMPOSITIONS

Donald F. Koenecke, Westfield, and Harold J. Brady, Bayonne, N. J., assignors to Esso Research and Engineering Company, a corporation of Delaware No Drawing. Application November 22, 1955
Serial No. 548,530

2 Claims. (Cl. 106—195)

This invention relates to an improvement in synthetic drying oils and more particularly relates to an improvement in the flexibility and gloss of the baked films from these drying oils.

Synthetic drying oils can be prepared by various methods from butadiene alone or from mixtures containing butadiene together with materials copolymerizable therewith. Sodium polymerization, emulsion polymerization as well as bulk polymerization in the presence of a diluent and a peroxide type catalyst have been used for this purpose with varying degrees of success. For some purposes it has been found desirable to partially or completely saturate the double bonds of these polymers with epoxide groups

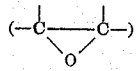

by reaction with a peracid or other compound capable of yielding oxygen in the presence of a solvent as described in Serial No. 486,972, filed February 8, 1955, in the names of Fitzgerald and Smith. However, films prepared from these epoxidized oils have been found to have a slow rate of baking requiring high temperatures and/or long time for curing to hard mar-resistant films. Although the ultimate baked film has good color and gloss, it is often impractical to reach a satisfactory cure in commercially acceptable time-temperature ranges. Furthermore, the curing rate depreciates upon aging.

In accordance with the present invention, it has now been discovered that the addition of 1 to 100 parts of cellulose ester i. e. cellulose nitrate lacquer solution to 100 parts of epoxidized polymer oil results in a composition which forms films with unexpected baking properties. Films that are 1.5 to 1.75 mils thick can be cured in 10 minutes at 325° F. to excellent hardness with good color and flexibility.

Polymers suitable for epoxidation, include those of butadiene, the copolymers of butadiene with monoolefins such as butene, styrene, substituted styrene, nitriles such as acrylonitrile, methacrylonitrile, esters of acrylic and methacrylic acid, and the like, especially where the monoolefin forms a minor part of the polymer. Other diolefins such as isoprene, piperylene, etc. may be used in lieu of butadiene. In general, the polymers of low to moderate molecular weight having a substantial proportion of unsaturated carbon-carbon bonds are useful.

The desired polymers may be prepared by several known methods, i. e. (1) by emulsion polymerization as described in U. S. Patent No. 2,500,983 to Frolich; (2) by solution polymerization as described in U. S. Patent No. 2,586,594 to Gleason; (3) by peroxide polymerization as described in Gleason et al. Patent No. 2,581,094; or (4) by solution polymerization with an alkali-metal catalyst as described in copending applications Serial No. 176,771, filed July 29, 1950, and Serial No. 420,498, filed April 2, 1954. If desired these polymers may be partially hydrogenated in accordance with copending application Serial No. 432,936, filed May 27, 1954.

A particularly desirable polymeric raw material is the product obtained by the sodium copolymerization of butadiene and styrene in accordance with application Serial No. 420,498 which is a solution of polymer in a suitable hydrocarbon solvent such as solvent naptha or mineral spirits. In appearance it is a clear, colorless to light yellow oily composition, the polymer content of which has a viscosity of about 0.15 to 22 poises at 50% N. V. M. and preferably 0.15 to 2.0 poises at 50% N. V. M.

Having selected the desired polymer, those of liquid butadiene-styrene type being preferred, the next step is to introduce the epoxide oxygen into the unsaturated bonds. In carrying out this operation the polymer is dissolved in a suitable solvent, such as normal heptane, benzene, chloroform, ethyl chloride or the like, and added to a solution of the oxidizing agent with vigorous agitation. Several hours may be required to complete the reaction, depending on the temperature, the type of polymer to be epoxidized and other factors. As oxidizing agents the peracids (R—COO$_2$H) or their salts, or the hydroperoxides may be used, the peracids such as peracetic and perbenzoic acid being preferred. Peracids may be prepared in any known manner, e. g. from the acyl peroxide as described by G. Braun on page 431 of Organic Synthesis, collective vol. 1, second edition (John Wiley & Sons, Inc., 1941), or by treating the acid or its anhydride with a peroxide such as hydrogen peroxide, Richter's Organic Chemistry, vol. 1, page 319 (1934).

The epoxidation reaction is carried out at a temperature in the range of 0–95° C. and preferably in the range of 20–50° C. The time of reaction depends upon such factors as temperature and degree of epoxidation desired. However, the usual reaction time is in the range of 1 to 60 hours, preferably in the range of 6 to 30 hours. The mole ratio of $C_4$ units contained in the liquid polymer to peracid in the process may be from 1:1 to 4:1, preferably from 2:1 to 3:1. The resulting product contains from 1 to 9.5 weight percent epoxide.

The nature of the epoxidized product depends largely upon the extent to which the epoxidation reaction is carried out, the time and temperature of the reaction and the nature of the product produced. The reaction can be carried out such that a solid product is obtained which is insoluble in hydrocarbons. However, the epoxidation can also be carried out so that a viscous liquid or semi-solid product which is soluble in hydrocarbons is obtained.

The advantages of the invention will be better understood from a consideration of the following experimental data which are given for the sake of illustration, but without intention of limiting the invention thereto.

Example I

An oily copolymer of butadiene and styrene was prepared according to the following recipe:

| | Parts by wt. |
|---|---|
| Butadiene | 80 |
| Styrene | 20 |
| Varsol | 10 |
| Naphtha | 190 |
| Dioxane | 30 |
| Sodium | 1.5 |
| Isopropanol | 0.3 |

Temperature, 40° C.

Complete conversion was obtained in 10 hours. The catalyst was destroyed and removed, and the product was finished to 90% N. V. M. by vacuum stripping and had a viscosity of 1.0 poise at 50% N. V. M.

Example II

In carrying out the epoxidation reaction the peracetic acid solution was placed in a 1-liter fluted flask and to it was added 200 grams of a 50% solution in normal heptane of a polymer oil similar to that described in Example I. This mixture was stirred vigorously for 28 hours at 20–27° C.

At the conclusion of the reaction, the mixture was washed six times with 250 ml. portions of water, after which the epoxide was taken up in dioxane and separated from the heptane. The epoxide was recovered, as a pale straw-colored semi-solid material, by distilling off the dioxane under vacuum.

*Example III*

A solution of the epoxidized polymer oil of Example II with an epoxy equivalent of 0.204 c. eq./g. on the polymer and a non-volatile content of 50.9% was blended with an equal volume of a ¼ second nitrocellulose solution in ethyl acetate and aromatic hydrocarbon solvents at 28% non-volatile material. This solution contained about 35% nitrocellulose and 65% epoxidized oil. It was drawn down with a gage clearance to deposit films 1.7–2.0 mils thick when cured. Films were cast of both original materials for comparison. The following results were obtained:

| Sample | Bake | Thick, mils | Hardness | | Flex. |
|---|---|---|---|---|---|
| | | | Sward | Pencil | |
| Epoxidized oil–Nitrocellulose mixture. | 10′ 325° F | 1.8 | 32 | H | ⅛ |
| Do | 10′ 325° F | 2.0 | 30 | H | ⅛ |
| Nitrocellulose solution | 10′ 325° F | fell of panel, no adhesion. | | | |
| Epoxidized oil alone | 30′ 325° F | 1.8 | 18 | HB–F | ⅛ |
| Do | 10′ 325° F | too tacky to measure. | | | |

From these data it is readily noted that the films of nitro-cellulose-epoxidized oil mixtures have superior hardness although baked only ⅓ as long. No loss in flexibility was observed since both films passed the ⅛ inch rod mandrel, the smallest used in this test.

At a lower baking temperature such as 275° F. the results are similar but more time is required to reach a satisfactory state of cure as shown by the following data:

| Sample | Time, min., 275° F. | Thick, mils | Hardness | | Flex. |
|---|---|---|---|---|---|
| | | | Sward | Pencil | |
| Nitrocellulose-Epoxidized oil mixture | 30 | 2.9 | 20 | H | ⅛ |
| Do | 20 | 1.9 | 18 | | ⅛ |
| Do | 30 | 1.9 | 24 | H | ⅛ |
| Do | 30 | 1.7 | 26 | H | ⅛ |
| Do | 30 | 3.0 | 20 | | |
| Do | 45 | 3.0 | 26 | H | ⅛ |
| Epoxidized oil alone | 60 | Tacky, just dust free but too tacky to measure hardness or thickness. | | | |
| Nitrocellulose solution | 20 | Blistered and fell off the panel, could not be measured. | | | |

*Example IV*

A blend of 80.8% by wt. of the epoxidized polymer oil solution of Example II and 19.2% ¼ second nitrocellulose used in Example III was cast into 3.5 mil films and baked at 275° F. for 45 minutes. A Sward hardness of 12 was obtained. A 60 min. bake resulted in a Sward hardness of 16, a pencil hardness of HB, and a flex of ⅛″. The epoxidized oil alone after a 60 min. bake gave a tacky but dust-free film. The nitrocellulose solution fell off the panel after 20 minutes.

*Example V*

A cold cut solution of an 18–25 centipoise nitrocellulose in toluene and ethyl acetate was prepared at 25% non-volatile content. The solvent mixture was 1 part toluene and 2 parts ethyl acetate by weight. This solution was blended with an epoxidized oily copolymer of butadiene and styrene (0.218 c. eq./g. epoxy group) in 51.1% solution to give a mixture that was 30% 18–25 cps. nitrocellulose and 70% epoxidized oil. Films were drawn down on metal plates and baked with the following results:

| Sample | Bake | | Thickness, mils | Hardness | Flexibility |
|---|---|---|---|---|---|
| | Time, min. | Temp., °F. | | | |
| Mixture of Example V [1] | 10 | 325 | 1.9 | 44 | ⅛ |
| Do.[1] | 5 | 325 | 1.8 | 18 | ⅛ |
| Do.[1] | 15 | 300 | 1.9 | 30 | |
| Do.[1] | 20 | 300 | 1.9 | 34 | ⅛ |
| Control [2] | 30 | 325 | 1.6 | 14 | ⅛ |
| Do.[2] | 30 | 300 | Too tacky to be measured | | |

[1] 18–25 nitrocellulose-epoxidized oil mixture.
[2] Epoxidized polymer oil.

*Example VI*

A solution similar to that used in Example V except that ½ second RS nitrocellulose (Hercules) was used instead of the 18–25 centipoise. The same epoxidized oil was used to prepare the blend of 70% polymer and 30% ½ second nitrocellulose. Films were drawn down on metal panels and baked with the following results:

| Sample | Bake | | Thickness, mils | Hardness | Flexibility |
|---|---|---|---|---|---|
| | Time, min. | Temp., °F. | | | |
| Mixture of Example VI [1] | 10 | 325 | 2.1 | 22 | ⅛ |
| Do.[1] | 11 | 325 | 2.7 | 20 | ⅛ |
| Do.[1] | 10 | 300 | 2.1 | 12 | ⅛ |
| Do.[1] | 20 | 300 | 1.8 | 18 | ⅛ |
| Control [2] | 30 | 300 | Too tacky to measure | | |
| Do.[2] | 30 | 325 | 1.6 | 14 | ⅛ |

[1] ½ second nitrocellulose-epoxidized oil mixture.
[2] Epoxidized polymer oil.

*Example VII*

A solution, prepared by shaking and agitation, of 25% ethyl cellulose, 75% solvent (4:1 xylene:n-butanol) was used to prepare the following blend:

4 pts. ethyl cellulose (solution at 25% N.V.M.)
36 pts. epoxidized polymer oil at 50.5% N. V. M.
4 pts. n-butanol Upon shaking this mixture was cloudy and heterogeneous. After being agitated on a wheel over night it was still incompatible.

Ethyl cellulose thus could not be used to replace nitrocellulose because of incompatibility.

*Example VIII*

An enamel base was prepared as follows:

150 g. titanium dioxide (Titanox A–16860)
110 g. epoxidized polymer oil (50.5% N. V. M.) solution were mixed to form a grinding paste which was passed through a 3 roll laboratory paint mill to obtain a dispersion fine enough for enamel smoothness. Additional epoxidized oil was added to the resultant paste to make it 40 percent polymer solids and 60 percent pigment on the non-volatile content. The percent non-volatile was 71.9%.

This enamel base was used in the following blend:

20 pts. by wt. of the above base
3.4 pts. by wt. of the epoxidized oil (1075–35)
10.7 pts. by wt. of ¼ second nitrocellulose solution at 28% N. V. M.

This enamel was 55.5% non-volatile. The non-volatile was 45% pigment, 16.5% nitrocellulose and 38.5% epoxidized oil.

Films were drawn down on metal plates and baked with the following results:

| Sample | Bake | | Thickness, mils | Hardness | Flex. |
| --- | --- | --- | --- | --- | --- |
| | Time, min. | Temp., °F. | | | |
| Mixture of Example VIII [1] | 30 | 300 | 1.3 | 48 | 1/8 |
| Do.[1] | 30 | 300 | 2.4 | 54 | 1/8 |
| Do.[1] | 10 | 325 | 2.6 | 46 | 1/8 |
| Control [2] | 30 | 300 | Too tacky to measure | | |
| Do.[2] | 10 | 325 | Too tacky to measure | | |
| Do.[2] | 20 | 325 | 1.6 | 14 | 1/8 |
| Do.[2] | 30 | 325 | 1.6 | 28 | 1/8 |

[1] Nitrocellulose-enamel blend.
[2] Epoxidized polymer oil alone.

From the above examples it is obvious that the blend of epoxidized oil and a cellulose ester exhibits unexpected curing properties resulting in hard, tough, glossy films with excellent color. At sufficiently high temperatures or long enough times of bake the epoxidized oil also forms good films, but for many uses the baking schedules are impractical. The benefits of this discovery are rapid cures at lower temperatures which enable production of coated objects such as appliances or automotive parts or other projected uses at a high level.

The nature of the present invention having been thus fully set forth and specific examples of the same given, what is claimed as new and useful and desired to be secured by Letters Patent is:

1. A coating composition comprising a mixture of 1 to 100 parts of cellulose nitrate and 100 parts of a polymer selected from the group consisting of homopolymers of butadiene and copolymers of butadiene with up to 50% styrene, said polymer having a substantial proportion of its double bonds converted, to the epoxide group

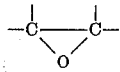

so that the final polymer contains 1 to 9.5% epoxide groups, said composition yielding films 1.5 to 3.5 mils thick which are hard and flexible after curing 10 to 60 minutes at 275° to 375° F.

2. Composition according to claim 1 in which the polymer is prepared by sodium polymerization of 75 parts butadiene and 25 parts styrene and has a viscosity prior to epoxidation of between 0.5 and 22 poises at 50% non-volatile matter.

References Cited in the file of this patent

UNITED STATES PATENTS

| 2,281,940 | Lewis | May 5, 1942 |
| 2,332,194 | Beekley et al. | Oct. 19, 1943 |
| 2,379,552 | Teppema | July 3, 1945 |
| 2,660,563 | Banes | Nov. 24, 1953 |

OTHER REFERENCES

"Epon Surface Coating Resins," published by Shell Chemical Corporation, May 15, 1948, page 29.